(12) United States Patent
Sobel

(10) Patent No.: US 9,161,667 B2
(45) Date of Patent: Oct. 20, 2015

(54) VACUUM CLEANER WITH ENHANCED SURFACE AREA FILTER

(71) Applicant: Martin M. Sobel, Flemington, NJ (US)

(72) Inventor: Martin M. Sobel, Flemington, NJ (US)

( * ) Notice: Subject to any disclaimer, the term of this patent is extended or adjusted under 35 U.S.C. 154(b) by 0 days.

(21) Appl. No.: 13/986,281

(22) Filed: Apr. 18, 2013

(65) Prior Publication Data

US 2014/0311107 A1    Oct. 23, 2014

(51) Int. Cl.
*B01D 39/00*    (2006.01)
*A47L 9/12*     (2006.01)
*A47L 9/20*     (2006.01)
*B01D 46/00*    (2006.01)

(52) U.S. Cl.
CPC . *A47L 9/127* (2013.01); *A47L 9/20* (2013.01); *B01D 46/0057* (2013.01); *B01D 46/0072* (2013.01)

(58) Field of Classification Search
CPC ........ B01D 24/04–24/08; B01D 24/28–24/32; B01D 46/0057–46/0083; B01D 25/34–25/386; B01D 33/0108–33/0191; A47L 9/10–9/248; A47L 9/1409
USPC .............. 55/282–305, 341.1–341.7, 361–382
See application file for complete search history.

(56) References Cited

U.S. PATENT DOCUMENTS

| | | | |
|---|---|---|---|
| 3,195,296 A * | 7/1965 | Janson | A47L 9/14 55/298 |
| 3,478,498 A | 11/1969 | Sauermann | |
| 3,568,413 A * | 3/1971 | Jerabek | 55/288 |
| 3,830,042 A | 8/1974 | MacDonnell | |
| 4,149,863 A * | 4/1979 | Ballard | 55/379 |
| 4,247,313 A * | 1/1981 | Perry, Jr. | B01D 46/0068 55/302 |
| 4,735,639 A * | 4/1988 | Johnstone | 55/302 |
| 4,906,265 A | 3/1990 | Berfield | |
| 5,244,703 A * | 9/1993 | Bosses | 428/35.2 |
| 5,308,369 A | 5/1994 | Morton et al. | |
| 5,308,485 A | 5/1994 | Griffin et al. | |
| 5,681,363 A * | 10/1997 | Tucker et al. | 55/300 |
| 5,690,710 A * | 11/1997 | Stephan | B01D 46/0001 55/361 |
| 5,783,086 A | 7/1998 | Scanlon et al. | |
| 6,110,248 A | 8/2000 | Liu | |
| 6,219,880 B1 * | 4/2001 | Worden | A47L 5/365 15/327.6 |
| 8,206,482 B2 | 6/2012 | Williams et al. | |
| 2007/0084786 A1 * | 4/2007 | Smithies | 210/490 |
| 2012/0279185 A1 | 11/2012 | Appelo | |

\* cited by examiner

*Primary Examiner* — Thomas McKenzie
(74) *Attorney, Agent, or Firm* — Walter J. Tencza, Jr.

(57) ABSTRACT

A filter kit with an enhanced surface area filter and cage, for an electric power vacuum cleaner, the filter is a self-cleaning, flexible interlocking fabric having a rest position at atmospheric pressure, and a stretched position when under vacuum of a vacuum cleaner, the fabric having at least enough stretchability to increase its surface area by at least 10% in its stretched position from its rest position. When the vacuum cleaner is operating, the filter is in its stretched position and collects dust and debris, and when the vacuum cleaner is off, the filter relaxes, returns to its rest position and its surface area contracts to be self-cleaning, and a portion of the dust and debris to fall from the filter.

9 Claims, 7 Drawing Sheets

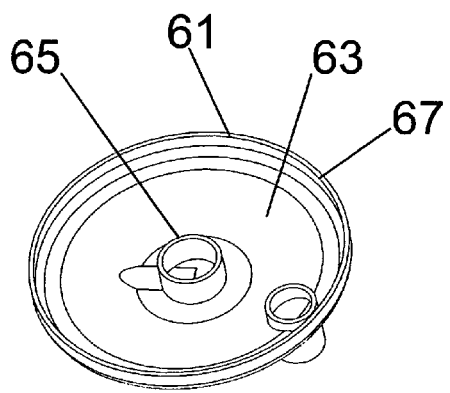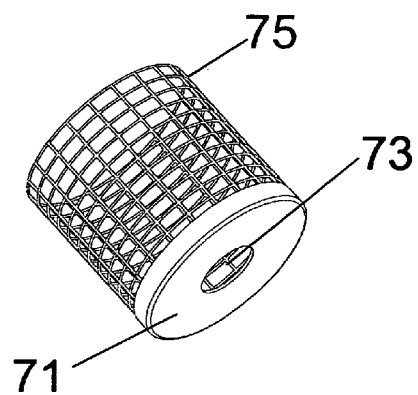
Figure 6                    Figure 7
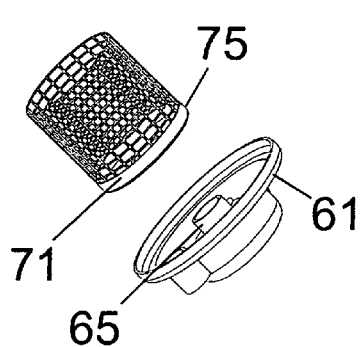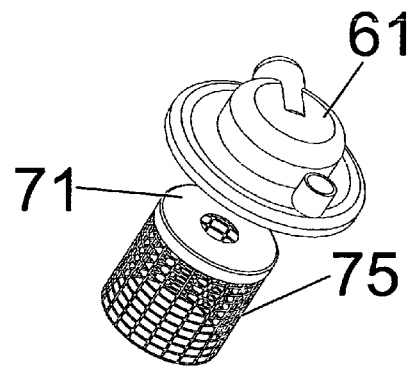
Figure 8                    Figure 9

| OEM VERSUS PRESENT INVENTION FILTER KITS ||| 
|---|---|---|
|  | Current OEM filters, non pleated | Maxavac Filters |
| Filter area, non pleated oem filters. (square inches) | 50-80 | 200-700 Limit only by the size of the vacuum tank |
| Pressure change upon filter installation ( pressure drop after install a new or cleaned filter) | -5% to -25 % | 0 to -10% |
| Loss of vacuum 1 cup of plaster of paris (dry wall powder) | -30% to -65 % | -5% to -20 % |
| Reusable, machine washable | no | yes |
| Environmental impact | Landfill abuse, Like diapers | 99 percent reusable. |
| Cost per filter renewal | 5 to 30 dollars | Twenty five cents (cost to wash) |
| Cost over life of vac assuming 100 filter renewals | Aprox 500 to 3000 dollars | Approx 25 dollars |
| Ease of filter replacement | Requires supporting foam filters and elastic bands. Cumbersome, unreliable | Uses Taper Tite clamp. No hassle. Quick, simple reliable. |
| Puncture resistance of filter bag | Paper filter prone to tare during install and easily punctured by picking up nails or other sharp objects | Puncture resistant due to stronger knitted or woven fabric. |
| FEV (FILTER EVALUATION FACTOR) The filter is rated by the percentage of vacuum remaining after taking in 2 cups of flour | 20-40 % | At least 80% |

*Figure 11*

VACUUM CLEANER WITH ENHANCED SURFACE AREA FILTER

BACKGROUND OF INVENTION a. Field of Invention

The invention relates generally to vacuum cleaners, including stationary and portable vacuum cleaning devices of all sizes and shapes. More specifically, the present invention relates to retrofit kits with enhanced surface area filters for vacuum cleaners and vacuum cleaners containing these enhanced filters. The present invention filters have increased relative surface areas and have stretchability that creates a self-cleaning feature. These characteristics in turn provide more efficient vacuuming and more use between filter cleanings. In addition, it has been found that these filters sustain higher vacuums (greater suction) for longer periods of time as compared to conventional filters. In some embodiments, the invention also involves an advanced filter cage for quick insertion and quick releases to and from the vacuum cleaner connections.

b. Description of Related Art

The following patents and applications are representative of various types of vacuum cleaners and filter systems:

United States Patent Application No. 2012/0279185 A1 to Appelo describes a vacuum cleaner primary filter cage wall element that is adapted to form, together with at least one complementary filter cage wall element, a tubular baghouse filter cage segment. The filter cage wall elements are provided with snap-locks, for snapping a first long side of the primary filter cage wall element to a second long side of the complementary filter cage wall element, and for snapping a second long side of the primary filter cage wall element to a first long side of the complementary filter cage wall element.

U.S. Pat. No. 8,206,482 B2 to Williams et al. describes vacuum cleaner filters, in particular replaceable vacuum cleaner filters suitable for both dry and wet/dry type vacuum cleaners, as well as systems incorporating the use of such filters and methods for their use. The filters include a plurality of adjacently positioned pleats arranged in a closed circumferential, cylindrically-shaped path, a top end cap having a central orifice capable of constricting a post on a vacuum filter cage, and optionally a molded end ring oppositely-spaced from the top end cap for engagement with the motor housing of a vacuum cleaner.

U.S. Pat. No. 6,110,248 to Liu at al. describes a dual filter assembly for a vacuum cleaner that includes an annular inner filter mountable on a filter cage of the vacuum cleaner. The inner filter has a lower end and a retaining ring is attached to the lower end. An annular outer filter is removably mounted surrounding the inner filter, with a lower end of the outer filter supported by the retaining ring.

U.S. Pat. No. 5,783,086 to Scanlon et al. describes an improved method of employing a wet/dry vacuum cleaner for wet material pick-up. By employing a hydrophobic and air permeable filter material, such as an expanded polytetrafluoroethylene (PTFE), with a tight gasket around its edge in a place of a conventional wet/dry vacuum filter, it has been determined that the filter can be retained in place at all times during operation, regardless of the material being collected.

U.S. Pat. No. 5,308,485 to Griffin et al. describes a filter assembly for use in a baghouse having a cell plate provided with openings. The filter assembly includes a collar, filter bag, tubular supporting cage and locking ring. The filter bag filters particulate material and extends from below the cell plate. The collar supports the filter bag and has a longitudinally extended portion and a flange portion. The longitudinally extended portion is affixed to the filter bag below the cell plate, while the flange portion extends along the cell plate as a rim above a respective opening. The collar acts as a gasket to seal a respective opening in the cell plate. The tubular supporting cage has a longitudinally extended portion that structurally supports the filter bag. The locking ring is integrally fixed to the supporting cage and locks an arrangement of the filter bag, collar and cage in place. The locking ring also can include a venturi affixed thereto to assist in filtering and cleaning operations.

U.S. Pat. No. 5,308,369 to Morton et al. describes a cylindrical filter bag including a wire mesh cage with an access opening in the cage proximate to the open end of the filter bag. A resilient snap band is provided around the outer circumference of the cylindrical filter bag. The snap band includes a pair of felt rings formed around the band and an annular groove between the rings. The snap band thus provided can be depressed into the access opening in the wire mesh cage to allow the filter bag to be readily positioned in an airtight manner within a circular hole provided in the tube sheet of a dust collector. The hole in the tube sheet is provided with a collar having a radially extended flange portion that is attached to the top surface of the tube sheet to center the collar above the hole. The wire tube mesh cage of the filter bag is further provided with a reinforcing sleeve that mates with the tube sheet collar, and a venturi that is positioned concentrically within the sleeve.

U.S. Pat. No. 4,906,265 to Berfield describes installing a dry material paper filter on the filter cage of an electric vacuum cleaner, a disk of porous paper filtering material or of cloth type fabric, laid over the panel enclosing the bottom of the filter cage and a ring is pressed up over the paper or cloth filter and over the panel. As the ring is drawn up over the filter cage, it folds and presses the paper or cloth filter around the filter cage. At the top of the filter cage, the ring secures the filter to the cage. An additional filtering sleeve may be disposed around the filter cage before the filter is installed over the cage and over the sleeve with the attachment ring. The sleeve may be of foam or other wet material filtering material. The filter installed with the ring is of dry filtering material, like paper or cloth. A marking or disk at the center of the filter helps a user place the filter over the filter cage before the ring is used to fold the filter into place.

U.S. Pat. No. 3,830,042 to MacDonnell describes a disposable filter bag for the intake air housing of a locomotive that has a generally rectangular box-shaped extended configuration and is of pliable sheet stock of full flow depth filter material to be collapsible for folding into compact form. The bag is mounted between external and internal cage-like frames that stabilize the extended configuration of the bag.

U.S. Pat. No. 3,478,498 to Sauermann describes a filter that comprises a frame and a filter element carried by the frame to define therewith an internal chamber. The filter element consists of two apertured supporting layers and a filter layer of fibrous filter material sandwiched therebetween. A plurality of supporting bars are located in the internal chamber and engage the inner surfaces of the filter element. A plurality of deflecting bars engage the outer surfaces of the filter element intermediate the reinforcing bars and deflect the filter element intermediate such reinforcing bars inwardly into the chamber.

Notwithstanding the prior art, the present invention is neither taught nor rendered obvious thereby.

SUMMARY OF INVENTION

The present invention is directed to a vacuum cleaner filter kit with an enhanced surface area filter for an electric power vacuum cleaner having a motorized vacuum system and a dust collecting canister with an air flow inlet and outlet connected thereto. The filter kit is positionable between the canister and the inside aspect of its outlet, wherein, when the vacuum cleaner is operating, there is a vacuum at the inlet in the canister and at the inside aspect of the outlet. The filter kit includes a self-cleaning, flexible interlocking fabric filter selected from the group consisting of knitted and woven, and a cage upon which it is removeably attached. The fabric filter is a washable, reusable fabric. The fabric filter has a rest position at atmospheric pressure, and a stretched position when under the vacuum of the operating vacuum cleaner, the fabric filter having at least enough stretchability to increase its surface area by at least 10% in its stretched position from its rest position. When the filter kit is in the vacuum cleaner and the vacuum is operating, the filter is in its stretched position and collects dust and debris, and when the vacuum cleaner is subsequently not operating, the filter relaxes, returns to its rest position and its surface area contracts to be self-cleaning, the contracting causing a portion of the dust and debris to fall from the filter. In some preferred embodiments, the filter may stretch by at least 20%.

In some preferred embodiments of the present invention enhanced surface area filter kit, the fabric filter includes continuous filaments and cut filaments to create a brushed fabric. In some preferred embodiments of the present invention filter kit, the fabric filter has a Filter Evacuation Factor, or Volkman factor, of at least 80. In some preferred embodiments of the present invention filter kit, the fabric filter has a fabric structure heft of about 2 to about 16 ounces per square yard.

In some preferred embodiments of the present invention enhanced surface area filter kit, the cage has a clamp to hold the fabric in place, and it is preferably a quick release clamping mechanism.

In some preferred embodiments of the present invention enhanced surface area filter kit, the cage has a solid base with an orifice adapted to fit the inside outlet of a canister (when inverted and installed, this base may be located at the top of the cage, with the then bottom of the cage being, in some preferred embodiments, fully open In some preferred embodiments of the present invention kit, the filter cage is a wire mesh cage having interstices of at least 0.2 sq. inches. In some preferred embodiments of the present invention, the filter cage is cylindrical.

In another embodiment of the present invention filter kit, the kit includes: a) a filter cage located between the canister and the inside of the canister outlet, the filter cage having a continuous wall with interstices; and, b) a washable, reusable flexible fabric filter (woven or knitted) positioned on the filter cage, the filter cage wall having a predetermined surface area, including the interstices, of X, and the filter having a surface area of at least 1.5X, the filter having a rest position at atmospheric pressure wherein it is loosely hanging from the cage, and the filter having a pulled position when under a vacuum of the vacuum cleaner when it is operating, wherein the filter is partially pulled through the interstices; such that when the vacuum cleaner is operating, the filter is in its pulled position and collects dust and debris, and when the vacuum cleaner is subsequently not operating, the filter relaxes, returns to its rest position and its surface area reshapes to be self-cleaning, the reshaping causing a portion of the dust and debris to fall from the filter. Further, this embodiment with the significantly oversized filter may include each, any combination and all of the preferred embodiments set forth in previous embodiments in this summary. Thus, such preferred embodiments include, but are not limited to, the embodiment of the significantly oversized filter wherein the filter is a self-cleaning, flexible interlocking fabric selected from the group consisting of knitted and woven, the fabric having a rest position at atmospheric pressure, and a stretched position when under the vacuum of the operating vacuum cleaner, the woven fabric having at least enough stretchability to increase its surface area by at least 10% in its stretched position from its rest position; such that when the filter is in the vacuum cleaner and the vacuum is operating, the filter is in its stretched position and collects dust and debris, and when the vacuum cleaner is subsequently not operating, the filter relaxes, returns to its rest position and its surface area contracts to be self-cleaning, the contracting causing a portion of the dust and debris to fall from the filter.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIGS. 6, 7, 8 and 9 are oblique representations of a filter cage adapter, adapter connected to a present invention cage, cage with adapter connected to a shop vacuum top component, and the same inverted (in its operational position), respectively;

DETAILED DESCRIPTION OF THE EMBODIMENTS

Figure 1:
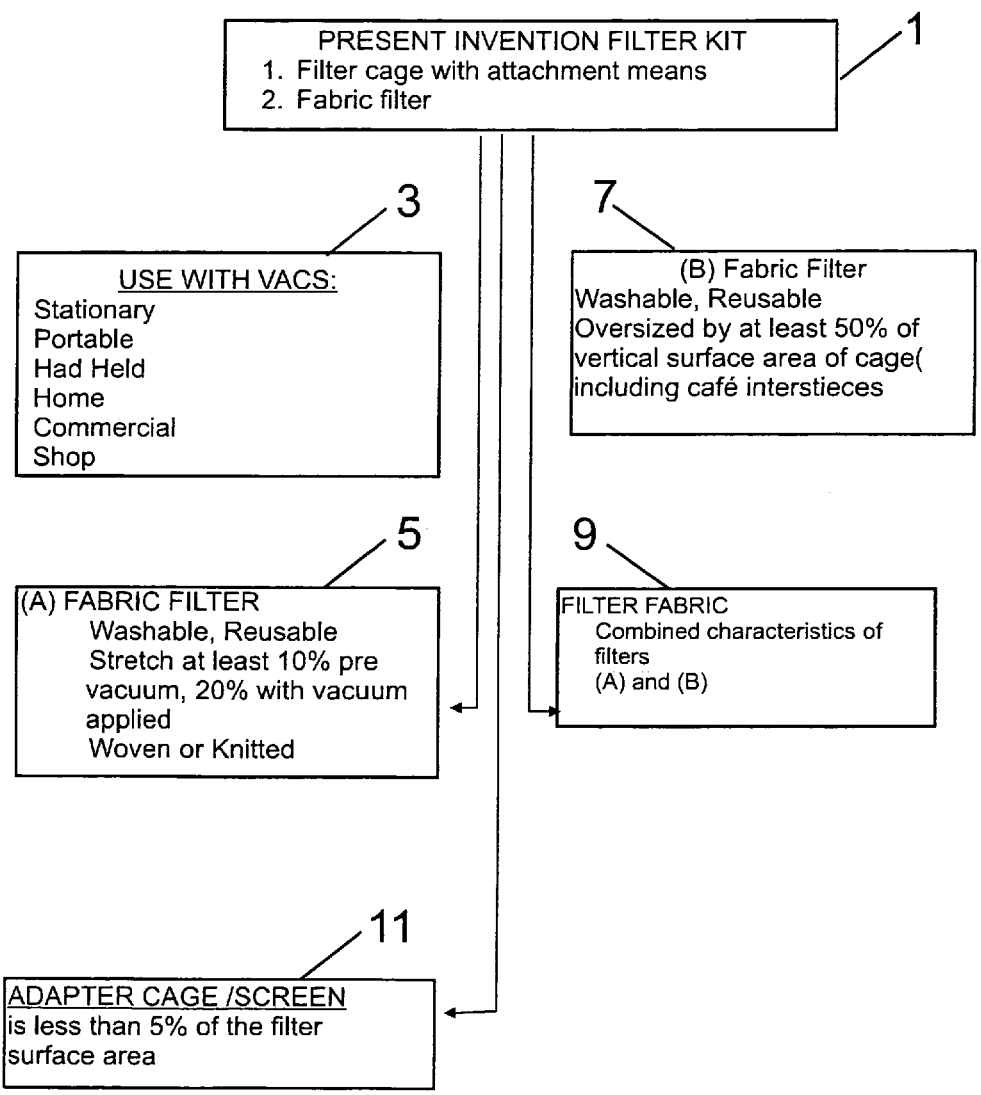
FIG. 1 is a block diagram of some embodiments of the present invention, setting forth the parameters of some present invention filter kits and related vacuum cleaners.

The present invention involves vacuum cleaner filter kits with enhanced functionality, increased suction and self-cleaning and numerous other unique features that will become more apparent in the following discussion.

The present invention relates to the velocity of air flow as it relates to filter area in vacuum systems. In vacuum cleaner systems, the blower develops negative pressure by being situated in an enclosed area and discharges the output to atmosphere via an outlet. In general, the vacuum cleaner consists of a tube or pipe which is used to apply to a suction or negative air flow to pick up debris and dirt material. A filter residing in a canister or housing is attached to the input of a blower which exhausts to atmosphere. The inside of the canister is under negative pressure that is provided by the blower. Thus the hose is in series with the canister in series with the filter In series with the outlet. The negative pressure within the canister is the driving force that sucks material through the pipe and into the canister. The velocity in the pipe is highest as the air is driven through the narrow diameter on it's way to the canister. When the air enters the canister there is a drop in velocity because pressure (negative or positive) depends in part on the area through which it travels. At this point, the heavier matter will drop out of the air stream and settle to the bottom of the canister. The lighter material such as flour, sanding dust or other powders and other light solids will be sucked to the surface of the filter and, depending on the pore size of the filter, the material will either pass through the filter or be held to the filter by the negative pressure. Depending on the size of the debris, at this point, it can lodge in the pores of the filter or be held to the surface of the filter by the negative pressure or suction. As the filter "clogs", the pressure drop across the filter increases and the pressure in the canister becomes less negative, reducing the ability of the vacuum to pick up debris. The rate at which this happens depends on the surface area of the filter, the size and quantity of debris, and the compaction of the debris on the surface of the filer. The pressure drop from the input of the vacuum pipe to the exhaust of the vacuum can be expressed as follows: Total pressure drop=Delta p of the hose+delta p of the canister+Delta p of the filter. A vac system becomes clogged as the delta p of the filter increases, thereby causing the canister pressure to be less negative, thereby reducing it's ability to pull debris through the pipe and into the canister. The turbulence of the air in the canister has a powerful effect on how much and what size of the debris, in the air stream will reach the filter and become lodged on its surface. In a small canister that contains a turbulent air flow, the debris will be suspended in the air stream and find its way to the surface of the filter where it will stay on the surface until the vacuum is shut off or become lodged or embedded in the filter pores when the combination of velocity, particle size and pressure drop can combine to force the debris into the filter pores.

It has now been discovered that by greatly increasing the surface area of the filter, both the pressure drop and velocity thru the filter are minimized, resulting in the following: a) the vacuum has stronger suction for a longer period; b) less debris and other material reached the filter surface; c) there is a self cleaning or higher drop off rate of the material that reaches the filter; and d) a self cleaning effect is caused by the non-uniform pressure drop across the filter surface as the material collect and fall off. It has been further discovered that the optimum vac design is when: a) the clean filter is large enough so that is does not cause a pressure drop of more than 5 percent of the total system drop; and, b) the volume of the filter does not occupy more than 30 percent of the volume of the canister. The state of the art in vacuum cleaner design seems to defy the above observations. It is interesting to note that there is another recent trend, which has been to keep the air velocity very high and design the canister so that its internal surface is such that it causes the high velocity air stream to take a circular path so that the particles in the air stream will be expelled or separated by centrifugal force. The separation of mass from air is also achieved by accelerations that are the result of abrupt changes in direction. This approach is more expensive to achieve, and while it is very effective in some cases it is much less competitive. This approach is the basis of the Dyson products and similar devices. Again, this prior art approach contradicts the above observations.

The present invention filter kits and their usage in vacuum cleaners are for improving the performance of vacuum cleaners by providing increased surface area, high efficiency filters when the vacuum cleaners are operated. Further, the present invention kits relate to all vacuum cleaners, including hand held, standup, roller and stationary vacuum cleaners. These kits are especially conveniently sized and function exceptionally well in shop vacs. Thus, some of the following discussions are presented in the context of shop vacuum cleaners with the understanding that the present invention is not limited thereto.

Referring now to the Figures, FIG. 1 is a block diagram of some embodiments of the present invention setting forth the parameters of some present filter kits and vacuum cleaners. In FIG. 1 illustrates block 1 as showing an overview of the invention, block 3 sets forth a sampling of the types of vacuum cleaners in which various embodiments of the present invention kits may be used. Block 5 illustrates one type of present invention kit with the stretching fabric feature, wherein the fabric filter is stretchable to at least 10% pre-vacuum and at least 20% under normal vacuum cleaner vacuum (negative pressure, i.e., suction). Block 7 illustrates another type of present invention kit showing the significantly oversized fabric feature. In these embodiments, the filter overhangs the cage and has at least a 50% surplus of surface area compared to the cage wall surface area (when measured including the cage wall interstices). Block 9 illustrates the most preferred present invention kit having the combined features of both block 5 and block 7. In all embodiments, the filter is both washable and reusable. Block 11 illustrates important features of the present invention filter cage. These include large interstices and a screen or cage structure that constitutes less than 5% of its surface area.

One objective of the present invention is to create more filter surface area in a given volume by using both the outer and inner cage wall surfaces created by folding the filter media over the filter frame also known as the adapter. With respect to the type of filters used in utility type vacuums, the cylindrical type filters use only the outside of the cylinder as a filtering surface. In the diagrams below it can be seen that the tall filter can be folded or draped over the frame to produce the same filter area within a package occupying approx ½ A the volume. The increased filter area, which converts to increase filter capacity will increase vacuum cleaner performance and reduce the number of filter cleanings.

The shop style vacuum cleaner has been around for a long time and is now the focus of discussion. While a shop vac is a very useful clean up tool, most people will agree that it clogs up quickly and needs to be emptied too often. In fact, most people will agree that all vacuum cleaners clog up quickly and need to be emptied too often. Although a shop vacuum cleaner generates a powerful vacuum, the vacuum is quickly overcome as the filter is covered with fine dirt and debris.

The present invention has been developed to provide a more simple filtering system for vacuum cleaners to reduce clogging, increase the number of hours between filter emptying and also to provide self-cleaning filters that are washing machine-washable and, for these and other reasons set forth below, are extremely ecologically friendly.

The present invention is a simple accessory kit for any vacuum cleaner, and including shop vacs that improves the performance and allows for less emptying of the vacuum. The kit provides a much larger filtering area and the filter medium/ material has been developed to be re-used many times. Hence, it is washable and reusable. When the present invention kit is installed in a shop vac to which it has been fitted, the vacuum power increases from about 20 to about 80 percent as compared to conventional shop vac filters. In addition to this large increase in suction power, the vacuum cleaner will continue to exhibit high performance for a much longer time between cleanings. As set forth above, the kit consists of: (1) a filter support cage (frame) with hardware to attach the cage to the vacuum cleaner canister outlet, and with hardware to secure the filter (aka "bag") to the frame, and (2) the fabric filter with its unique characteristics. The present invention filter kit may be retrofitted as a kit to improve the performance of existing machines, or incorporated into the design and manufacture of new equipment.

Figure 2:
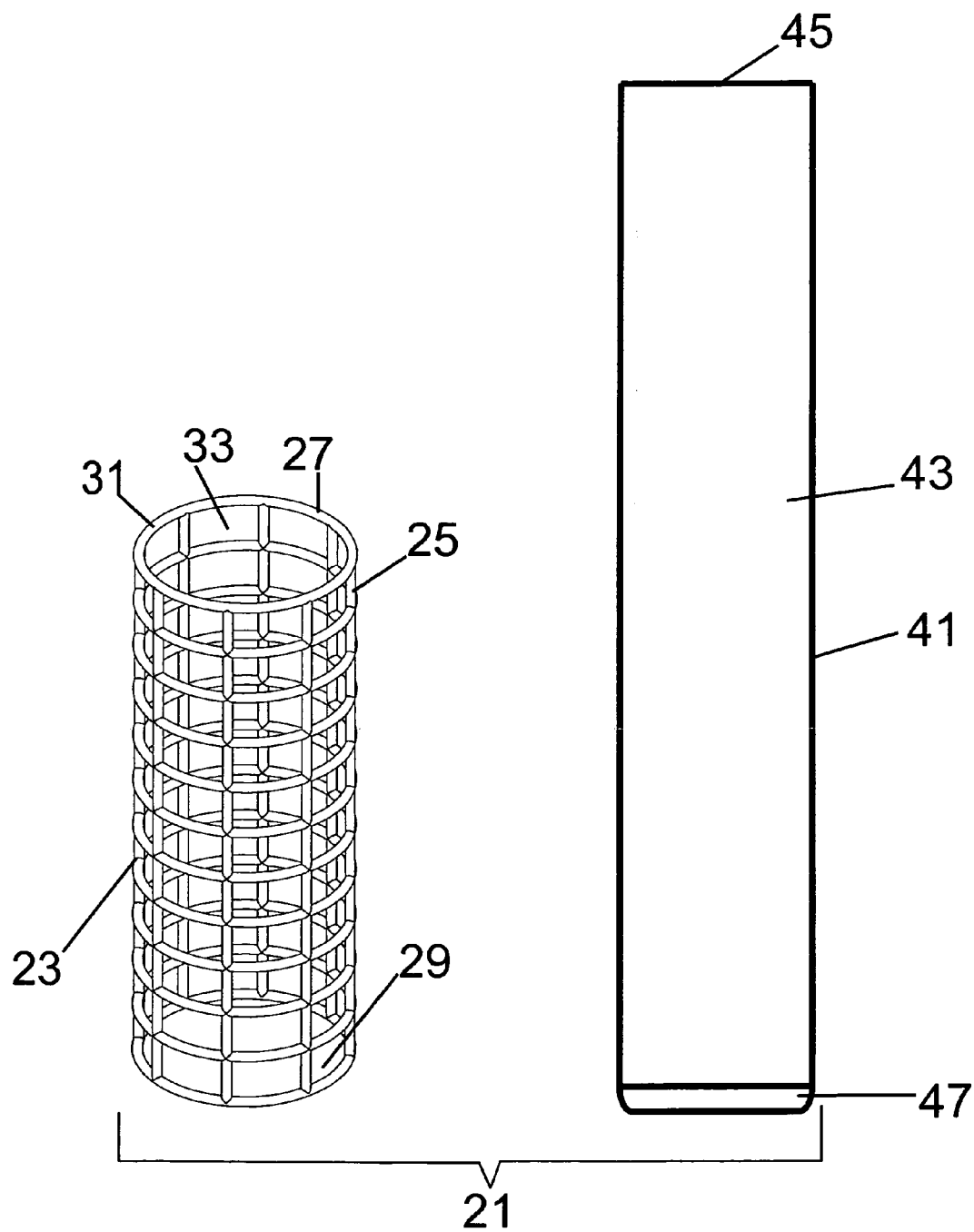
FIG. 2 is illustrates an embodiment of a present invention kit, with the filter cage shown in an oblique front view and an elongated filter being shown in a front view.
Figure 3:
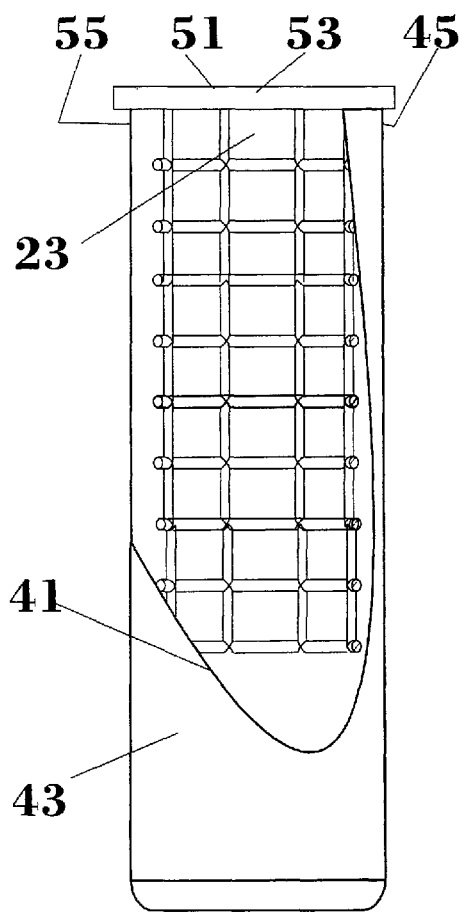
FIG. 3 is a front, partially cut view of the kit shown in FIG. 2, but in assembled form, with no vacuum pressure.

FIG. 2 illustrates an embodiment of a present invention kit 21, with the filter cage 23 shown in an oblique front view and an elongated filter 41 being shown in a front view. Filter cage 23 has a cylindrical shape, but any shape, e.g., oval, rectangle, irregular, polygonal, tapered, conical, etc. Odd shapes, irregular shapes or combined shapes may be used, such as round toup and a flared rectangle below the circular section, as long as the cage is elongated, has the requisite interstices and has connectability to the vacuum cleaner. Most important is that the filter for these embodiments be much longer than the cage walls and that the base of the cage be open or at least partially open, for the reasons discussed in conjunction with FIGS. 4a and 4b, below. In this embodiment shown, the cage 23 is formed of wire fence material, has a top 27 and an open bottom 29. The cage 23 has vertical wiring 25 and horizontal wiring 31, with relatively large interstices 33, at least 0.2 sq inches in open area, to enable the flexible filter 41 to be pulled in a little (stretch and deform), which will be released when the vacuum is shut off, causing contraction and change of shape to cause dirt to fall off and to hence clean the filter for the next vacuuming. The filter 41 is made of a flexible, washable reusable material 43 that is woven or knitted. It has an open top 45 and a closed bottom 47 and fits over the cage 23 with significant surface area surplus (overhang). This is illustrated in FIG. 3. In this FIG. 2 embodiment of the present invention, the filter 41 is a fleece material.

The filter as used in the present invention kit is a soft, woven or knitted material. In preferred embodiments, the filter fabric is mostly synthetic fabric that has a relatively smooth surface with an inner brushed or combed surface, especially fabrics generally known as fleece. These filter fabrics have the following characteristics: machine washable; sensitive to surface pressure and tends to release the particles that are held to its surface by pressure drops; due to its flexibility and relatively heavy weight and bulk, it responds well to being shaken or whipped about so as to release and reject the debris deposited on its surface when the vacuum is operated. In the preferred embodiments utilizing fleece, the fleece or combed surface, which is a random orientation of shredded or torn fibers, is of lower density then the outer surface of the fabric. Its structure is such that is very likely to snag particles that have penetrated the highly oriented surface of the woven part of the fabric. The fabric can be seen as a media that has a strong oriented woven layer to which a fuzzy, tangled layer is attached. The difference in porosity of the two layers working under the low pressure drop of the filter constitutes a very effective two stage filter system. The combination is one of strength and relatively low, but very effective, porosity.

Figure 4A:
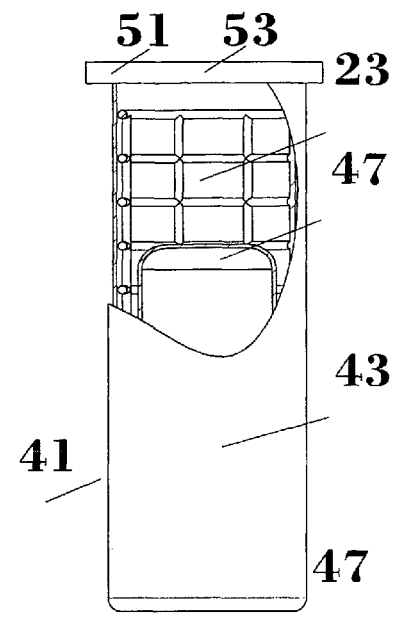
FIG. 4a is a view of the FIG. 3 kit, but with vacuum applied and the extended portion of the filter being inverted to create significantly greater surface area than just the outside of the filter cage.
Figure 4B:
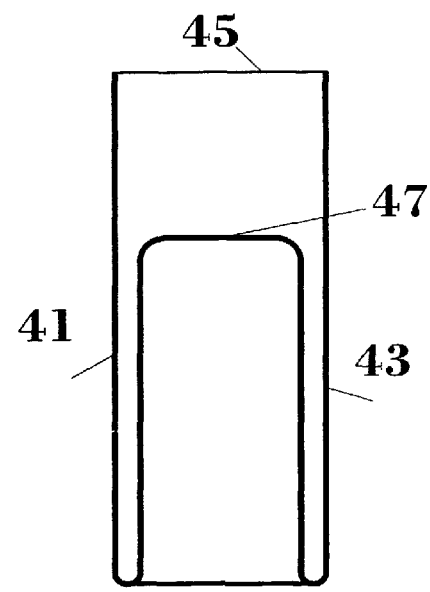
FIG. 4b shows the filter under vacuum with the cage removed from the Figure to clearly show the filter shape under vacuum.

FIG. 3 is a front, partially cut view of the kit shown in FIG. 2, but in assembled form, with no vacuum pressure applied. (Identical components in all of these related Figures are identically numbered.) FIG. 4a is a view of the FIG. 3 kit, but with vacuum applied and the extended portion of the filter being inverted and pulled up into the cage to create significantly greater surface area than just the outside of the filter cage. This has the advantage of increase surface area for dirt contact, giving more vacuum per unit weight of dirt, and when relaxed will automatically fall and release much of the dirt that would otherwise clean to and clog the filter. FIG. 4b merely shows filter 41 as in FIG. 4a under vacuum on the cage 23, but with cage 23 removed from the Figure to more clearly show the shape of filter 41 under vacuum on its cage 23 in a vacuum cleaner.

Figure 5:
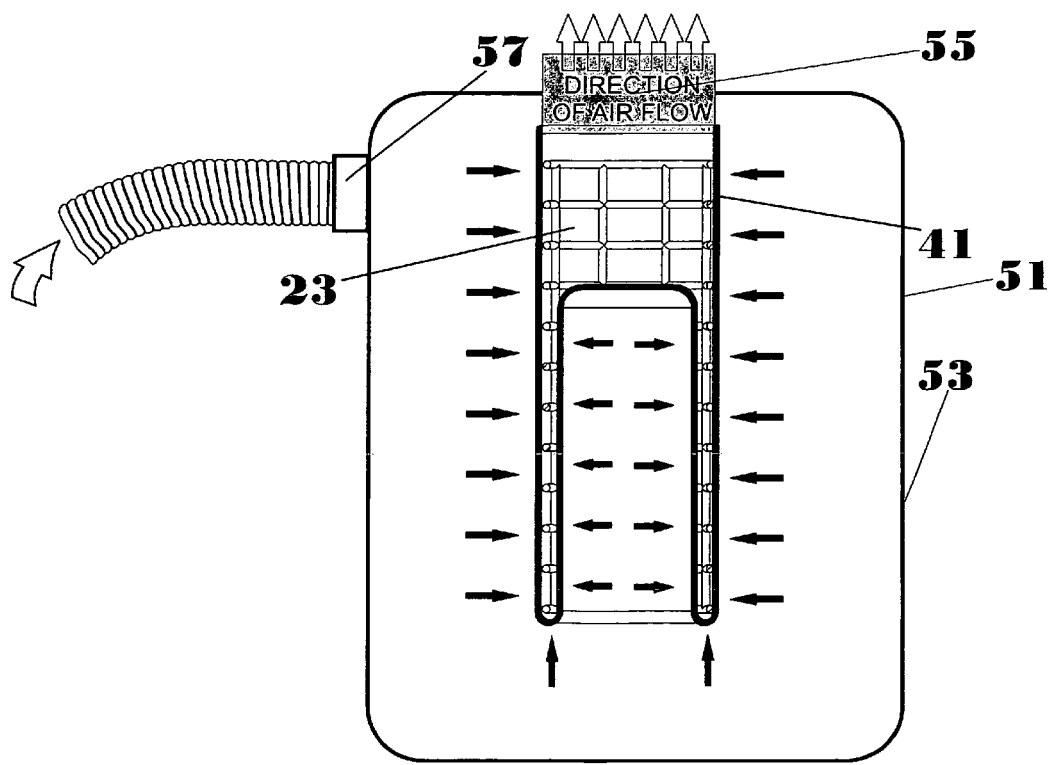
FIG. 5 is a schematic representation of a vacuum cleaner with the above shown FIG. 4 kit in place.

FIG. 5 is a schematic representation of a vacuum cleaner with the above shown in FIG. 2 through FIG. 4a kit in place. Here vacuum cleaner 51 may be a shop vac or an upright vac and has a housing 53 with an inside container area for vacuumed debris that is externally closed except for vacuum motor and outlet 55 and vacuum inlet 57. The arrows represent air flow direction (suction), and it can be seen that there is a significant surface area advantage as compared to conventional vacuum filters that are either rigid structures (e.g. accordion filters) or tight fit bags or stand alone rigid bags.

The present invention kit filter is easier to install and remove than conventional filter media because it is slipped over a form fitting cage, which provides an anvil or armature over which to slip the filter bag. Removal of the filter is also easier because the ratio of length to diameter makes it easy to pull the bag off and turn it inside out at the same time. This action traps the debris inside the bag and makes for less mess during transport of the debris filled bag. The cage is designed so that it provides a shaped surface which supports the filter bag and allows for distortion or movement of the bag under conditions of high vacuum. The present invention filter is secured to the cage such that it is less likely to slip off the vacuum cleaner housing. Attachment can be with a clamp, snap on, magnetic or any other means that assures minimal leakage and strong mechanical attachment.

This invention is a filter kit that provides a combination of a filter and supporting cage which serves to maximize filter surface for a given volume. The objective is to build a frame or cage structure that supports a flexible filter media. The media will drape over the filter support cage as a result of gravity, pressure drop, placement and smoothing by the user. Thus, the invention may be seen as a convoluted free forming filter and cage combination. Its final shape and conformance to the shape of the supporting frame will be combinations of these forces and techniques.

FIGS. 6, 7, 8, 9 and 10 are oblique representations of preferred embodiments of present invention filter kits, showing structure and fittings details and components.

Figure 10:
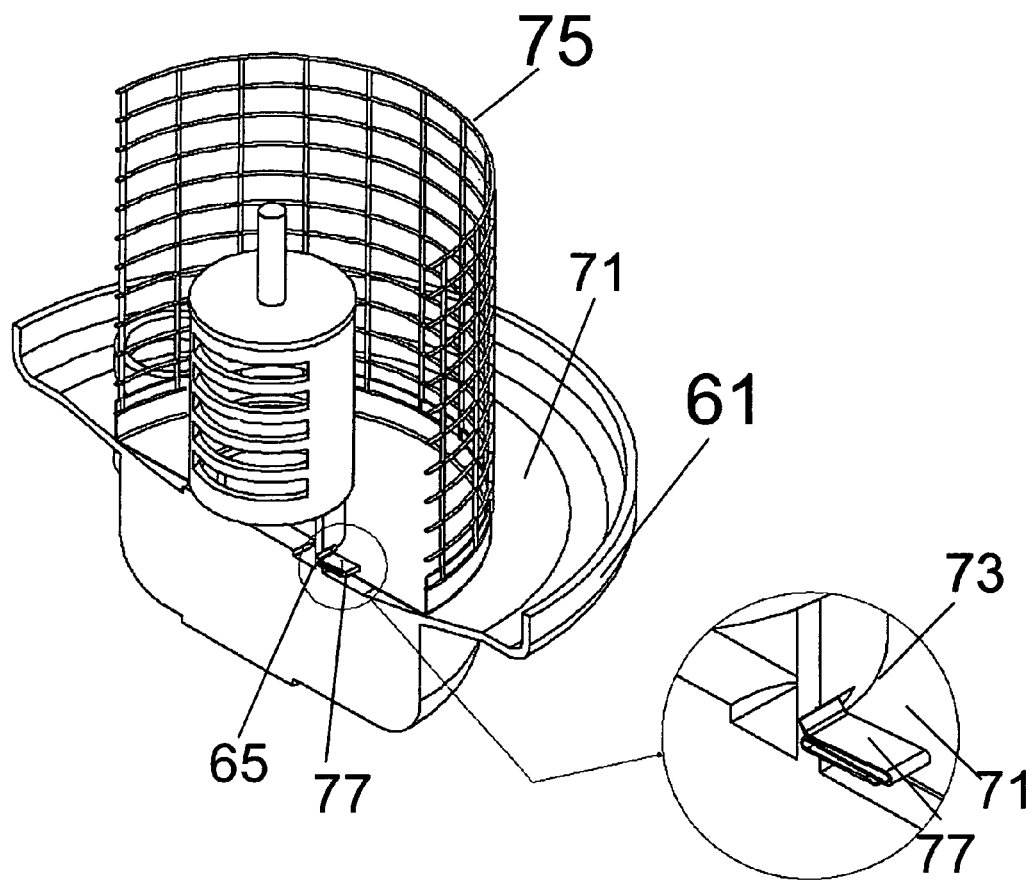
FIG. 10 is an oblique cut view of a present invention kit showing details of a preferred attachment mechanism, being a frictionally engaging spring clip; and, FIG. 11 is a comparative table illustrating the significant present invention kit advantages as compared to conventional original equipment manufacturer's filter systems.

In FIG. 6, a vacuum cleaner cover-removable top 61 is shown and includes a main panel 63 (here, circular) with an outlet 65 and an attachment rim 67 for attachment to the remaining portion of the vacuum cleaner housing. (In this Figure, the original equipment manufacturer's small filter holder has been removed for clarity, but is shown in FIG. 10 below. FIG. 7 shows a present invention kit cage 75 with an adapter 71 attached thereto for subsequent attachment to inlet 65 shown in FIG. 6. Filter cage adapter 71 has a central orifice 73, for attachment to inlet 65, FIGS. 7 and 8. In FIG. 9, a blown apart assembly is shown, not inverted.

FIG. 10 is an oblique cut view of a present invention kit showing details of a preferred attachment mechanism, being a frictionally engaging spring clip. The filter cage 75 and adapter 71, described above, are connected to outlet 65 of top 61, but are maintained in tight assemblage via friction clip 77. If clip 77 is pressed downwardly, its frictional engagement with outlet 65 is released for removal, as desired. This is, thus, a quick release removable assembly. Other attachment means could be with screws, pins, clips or any known attachment mechanisms.

FIG. 11 is a comparative table illustrating the significant present invention kit advantages as compared to conventional original equipment manufacturer's filter systems. The table shows unexpected test results obtained when using present invention excessive surface area (over 50%), high stretching (at least 20% under vacuum cleaner negative pressure) fabric and cage kit. These tests were made with the same vacuum cleaner and motor on both the oem filters and the present invention filter kits.

In summary, some of the important features of the present invention filter kits are:
1. The filter cage is a porous structure that supports the filter media and allows flow of air to pass thru its surface.
2. A soft compliant filter fabric is used, which can be folded and shaped—a woven or knitted fabric.
3. The filter is placed on the cage and is draped such that it covers the surface of the cylinder and drapes into the center of the cylinder.
4. The combination of the frame and the bag forms a compact volume efficient filter assembly.
5. In some preferred embodiments, an adapter in provided for the installation of a broad range of filters that are not available for the existing types of mounts used in vacuums cleaners, currently being sold. Current filter mounts consist of a short cylindrical pipe the accepts specific filters, the size and shape of, are limited to these mounting systems. The present invention adapter serves to provide a means to attach other types of filters of varying capacity and media types. The adapter can readily be attached to the filter mount system by clamping, or using fasteners such as screws, staples, nails etc, or a system of clamps, clips and catches, that are generally know for this type of attachment.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A portable vacuum cleaner arrangement:
an electric power vacuum cleaner comprising a container;
a filter kit located within the container, the filter kit comprising:
a flexible fabric filter which is stretchable to a stretched position and which may be relaxed to a relaxed position, wherein the fabric filter has an open top, a closed bottom and a wall between the open top and the closed bottom, wherein the flexible fabric filter is located within the container during the relaxed position and the stretched position and,
a filter cage having an attachment mechanism configured to be attached to an outlet of the electric power vacuum cleaner, wherein the filter cage comprises a cage wall, interstices disposed along the cage wall and an open bottom;
the flexible fabric filter is secured to the cage such that in the relaxed position a first portion of the fabric filter wall covers the entire outer surface of the cage wall while a second portion of the fabric filter wall located at the bottom of the fabric filter comprises an overhang which loosely hangs from the bottom of the cage such that the fabric filter has at least 50% surplus of surface area compared with a surface area of the cage wall when measured including the cage wall interstices;
wherein when the electric power vacuum cleaner is operating, said flexible fabric filter is in the stretched position such that the overhang is sucked into the open bottom of the cage such that the overhang covers at least half the length of the cage while the first portion of the fabric filter wall covers an outer surface of the filter cage, and wherein when said electric power vacuum cleaner is subsequently not operating, said flexible fabric filter relaxes, and the overhang returns to the relaxed position and the surface area of the flexible fabric filter contracts to be self-cleaning, said contracting causing a portion of said dust and debris to fall from said flexible fabric filter.

2. The filter kit of claim 1, wherein
said fabric filter includes continuous filaments and cut filaments to create a brushed fabric.

3. The filter kit of claim 1, wherein said flexible fabric filter has a fabric structure heft of about 2 to about 16 ounces per square yard.

4. The filter kit of claim 1 wherein said flexible fabric filter has a fabric structure heft of about 2 to about 16 ounces per square yard.

5. The filter kit of claim 1 wherein said filter cage includes a clamping mechanism for holding said flexible fabric filter on said filter cage.

6. The filter kit of claim 5 wherein said clamping mechanism is a quick release clamping mechanism.

7. The filter kit of claim 1 wherein said flexible fabric filter is a washable, reusable filter.

8. The filter kit of claim 1 wherein said filter cage includes a base adapter that includes a horizontal member with a central orifice adapted to fit a vacuum cleaner canister outlet of the electric power vacuum cleaner.

9. The filter kit of claim 1, wherein said filter cage is a wire mesh cage having interstices of about 0.2 sq. inches.

* * * * *